3,175,625
PLOW HAVING EARTH FENDER ATTACHMENT
Ossie C. McIntire, Rte. 1, Farmersville, Tex.
Filed Jan. 7, 1963, Ser. No. 249,658
3 Claims. (Cl. 172—513)

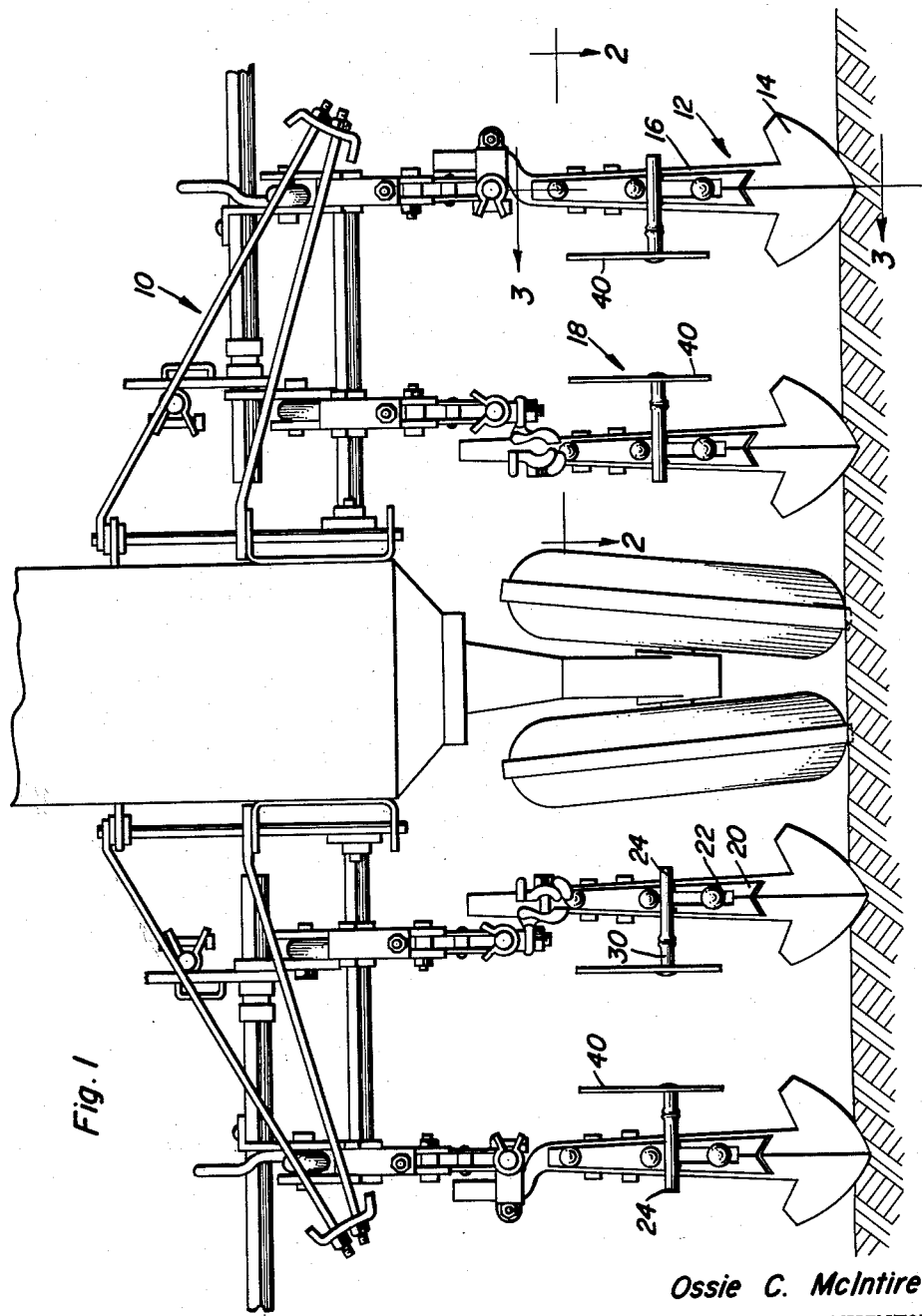

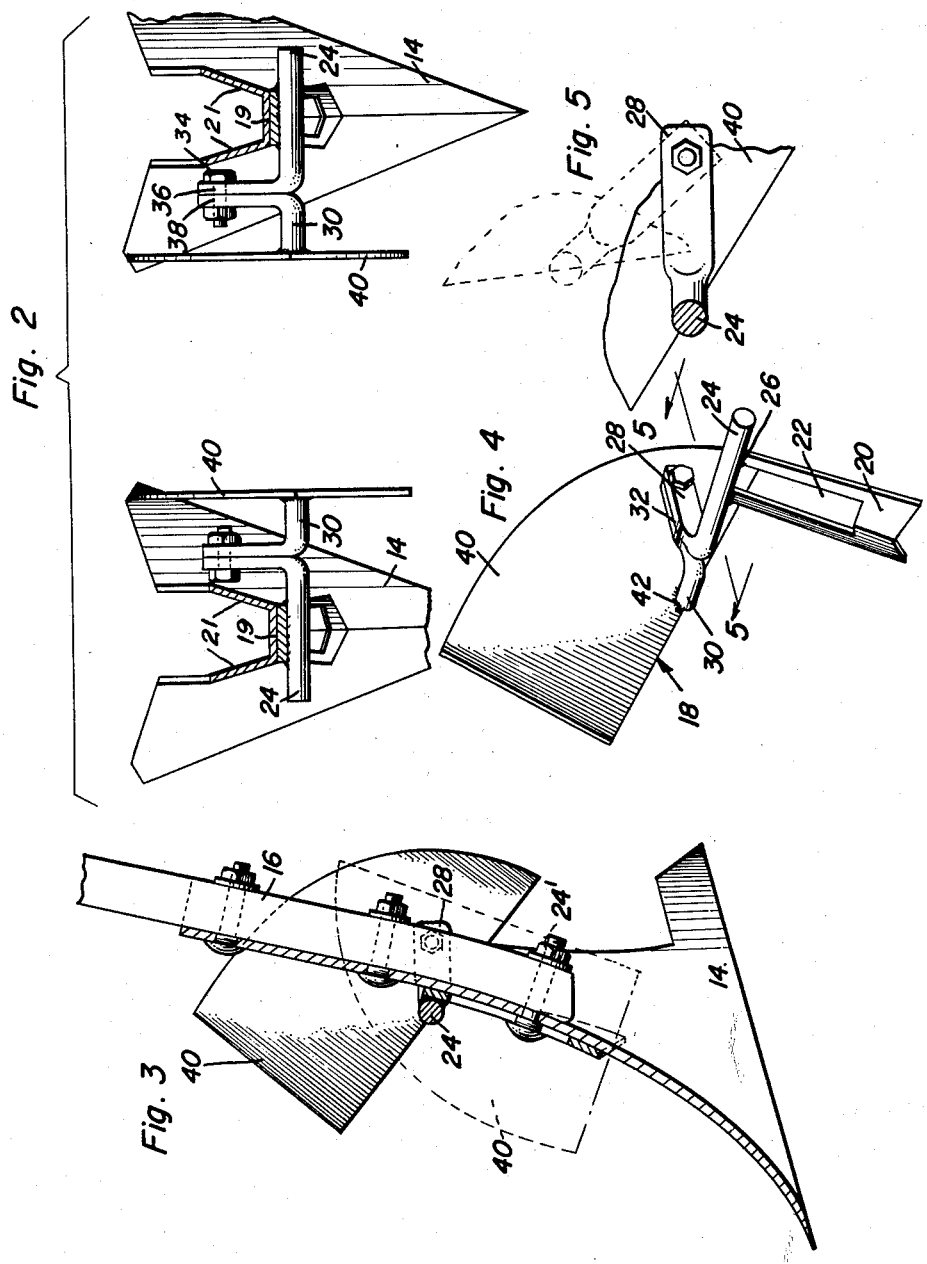

This invention generally relates to a plow attachment whereby the direction of the plowed earth is controlled.

Heretofore, it was common that in plowing operations plowed earth would be plowed upon adjacent plants causing destruction of the plants either by completely covering the plant with earth or by breaking the stalks or leaves of the plant. This invention therefore contemplates novel means whereby plowed earth will be confined to the rows between plants and contemplates adjustment means wherein the amount of earth plowed adjacent a plant may be controlled by a simple adjustment operation.

Accordingly, it is an object of this invention to provide a plow attachment comprising safety shield means for preventing plowed earth from falling upon adjacent plants in the field.

A further object of this invention is to provide a device of the character indicated wherein the amount of earth piled adjacent a plant may be varied at the will of the operator.

A still further object of this invention is to provide a plow attachment which may be adapted for use with any conventional plow.

A still further object of this invention is to provide a plow attachment of the character indicated which requires a minimum number of parts, is easy to fabricate, and is efficient in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a front elevational view of a conventional plow subframe showing the attachments comprising the subject matter of the instant invention attached to the plow blades.

FIGURE 2 is a fragmentary detailed sectional view taken substantially along line 2—2 of FIGURE 1.

FIGURE 3 is a fragmentary detailed sectional view taken substantially along line 3—3 of FIGURE 1 and illustrating certain details of the instant invention.

FIGURE 4 is a perspective view of the plow attachment comprising the subject matter of the instant invention.

FIGURE 5 is a fragmentary detailed sectional view taken substantially along line 5—5 of FIGURE 4.

Referring to the drawings now in detail, a conventional plow subframe is indicated generally by the numeral 10. The subframe 10 mounts a plurality of plow implements such as 12, which comprise a shovel or spade element 14 formed bolted to an elongated shank 16. The shank portion 16 is usually solid to provide rigidity for the plow implement. The plow implements 12 are usually disposed between rows of crops or plants and the earth therebetween is usually plowed to enable moisture to penetrate to the roots of the adjacent plants or for any similar operation. It has heretofore been a problem that the plowed earth rolls off the spade element 14 and may be flung against the plants in adjacent rows thereby breaking or damaging them or in some cases causing complete destruction thereof by covering them with the plowed earth. It has also been a problem in that the amount of earth piled upon the row could not be controlled and often an excessive amount of earth was piled adjacent the rows of plants thus precluding sunlight from the plants and further presenting the problem that the high bank of earth plowed would break down and smother the adjacent plant.

To obviate these difficulties, an attachment shown generally at 18 was devised and mounted upon the shank portion 16 of the plow implements 12. With particular reference to FIGURES 2 to 5 of the drawings, the attachment 18 generally comprises a mount 20 including an upstanding front wall 19 and a pair of rearwardly directed opposite side walls 21 which may be attached to the elongated shank portion 16 of the plow implement 12. The mount 20 has an elongated vertical slot 22 cut in its front wall 19 and cooperates with bolts such as 24' to slidably mount the attachment 18 upon the shank portion 16 of the plow implement 12, as will be readily apparent from FIGURE 3. The bolts 24' may be loosened, and the plow attachment 18 may be slid to a suitable vertical height and the bolt element may then be tightened once again to hold the plow attachment 18 in adjusted position. This adjustment is necessary since the plowed rows may be adjacent plants of different height at different periods of their growth, and it is desired to protect the stalks and leaves thereof.

Transversely mounted at one end of the mount 20 is a circular rod 24 which is rigidly fixed to said one end of the mount 20 by means of welding such as 26 or the like. One end of the rod is bent approximately 90° and is formed with a flattened face 28 thereon. A second horizontal rod member 30 is bent approximately 90° at one end thereof and is formed with a flattened mating face 32 for mating engagement with the flattened face 28 of the first rod member. A bolt or the like 34 extends through aligned apertures 36 and 38 in the flattened faces 28, 32 so that one rod member may pivot relative to the other.

Mounted at the other end of the horizontal rod member 30 is an arcuate shield member designated by the numeral 40. The shield member is rigidly attached as by welding 42 or the like to said horizontal rod member 30. It should now be evident that by loosening the bolt member 34 the horizontal rod 30 and its associated shield member 40 may be pivoted to any suitable angular inclination with the ground level and held in adjusted position by merely retightening the bolt 34.

It should be noted, as shown in FIGURE 1, that adjacent shield members 40 are disposed in face-to-face relationship in order to protect a row of planted crops which are disposed between the shield members 40. As the plowing operation proceeds, earth will be thrown rearwardly against the shank portions 16 of the plow implements and will ultimately contact the horizontal rod members 24, 30 which will force the plowed earth against the shield 40 rather than allowing it to flow rearwardly of the plow implement 12. The shield members 40 are disposed at a height so as to protect any leaves and stalks at that particular vertical extent with respect to the ground level. With particular reference to FIGURES 3 and 5 the shield element 40 is shown in one position shown by the solid lines and is shown pivoted to another position shown by the lines in phantom. Tilting the shield forwardly as shown in phantom lines in FIGURE 3, lets the earth fall onto the row in desired amounts or stops it completely from falling on the row adjacent the plants. Tilting it to a position such as shown in solid lines in FIGURE 3 enables the plowed earth to fall upon the row almost completely and any intermediate position may be assumed to control the flow of earth between the two aforesaid extreme positions shown in FIGURE 3. The whole attachment may be raised and lowered by means of the cutout adjustment cooperating with the shank of the plow to vary the vertical extent of the adjustment in accordance with the size of the crops adjacent the plowed row. As noted from FIGURES 1 and 2 the shield members 40 are placed in face-to-face relationship on adjacent plows to protect the planted crops from both sides.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In combination: an elongated upright tool shank, an earth-engaging shovel including an upwardly projecting shank having a front wall and a pair of rearwardly directed opposite side walls defining a rearwardly opening channel therebetween in which the lower end portion of said tool shank is snugly and embracingly received, said shanks being disposed in a substantially vertical plane extending longitudinally of the direction of travel of said tool shank, a plurality of vertically spaced headed fasteners secured through said front wall and said lower end portion of said tool shank, an attachment for said shovel comprising an upstanding plate-like mount overlying the front face of said front wall in surface-to-surface contacting relation therewith and having an upstanding slot formed therein through which the lowermost of said fasteners is secured, a first substantially horizontal rod member rigidly fixed upon the upper end of said mount and extending transversely said direction of travel, one end of said rod member including a first generally horizontal and right angulated end portion defining a first abutment face remote from said mount, a second generally horizontal rod member generally paralleling said first rod member and including a second generally horizontal right angulated end portion on one end defining a second abutment face extending longitudinally thereof and facing away from the other end of said second rod member, means pivotally securing the free ends of said angulated end portions together with said abutment faces in surface-to-surface frictional engagement with each other and said other end of said second rod member projecting away from said mount and generally paralleling said first rod member, and a panel-like shield member disposed in a plane normal to said second rod member and secured to the said other end of said second rod member.

2. The combination of claim 1 wherein said means pivotally securing said second rod member to said first rod member includes means releasably retaining the former in adjusted rotated positions relative to the latter.

3. The combination of claim 1 wherein said first angulated end portion projects rearwardly of said tool shank.

References Cited in the file of this patent
UNITED STATES PATENTS

| 662,081 | 11/00 | Murphree | 172—744 X |
| 668,770 | 2/01 | Brook | 172—509 |
| 676,595 | 6/01 | Walker | 172—509 |
| 1,377,183 | 5/21 | Calk | 172—511 |
| 1,581,227 | 4/26 | Pratt et al. | 172—513 |
| 2,568,572 | 9/51 | Van Zee | 172—711 X |
| 3,000,451 | 9/61 | Adams | 172—376 X |

FOREIGN PATENTS

| 546,186 | 9/57 | Canada. |

T. GRAHAM CRAVER, *Primary Examiner.*